United States Patent [19]

Jakobsson

[11] Patent Number: 4,714,821

[45] Date of Patent: Dec. 22, 1987

[54] HEAT ACCUMULATOR

[76] Inventor: Leif Jakobsson, Vindön 8736, Henån, Sweden, 440 90

[21] Appl. No.: 626,858

[22] PCT Filed: Oct. 26, 1983

[86] PCT No.: PCT/SE83/00366

§ 371 Date: Jun. 27, 1984

§ 102(e) Date: Jun. 27, 1984

[87] PCT Pub. No.: WO84/01814

PCT Pub. Date: May 10, 1984

[30] Foreign Application Priority Data

| Oct. 26, 1982 | [SE] | Sweden | 8206155 |
| Nov. 11, 1982 | [SE] | Sweden | 8206403 |
| Nov. 11, 1982 | [SE] | Sweden | 8206404 |
| May 6, 1983 | [SE] | Sweden | 8302610 |

[51] Int. Cl.$^4$ .......... H05B 1/02; F24H 7/02; F24D 11/00

[52] U.S. Cl. .................. 219/326; 126/400; 165/18; 165/104.21; 219/302; 219/341; 219/378

[58] Field of Search ........... 219/378, 365, 341, 325, 219/326, 302; 165/18, 104.21; 126/400

[56] References Cited

U.S. PATENT DOCUMENTS 4,105,895 8/1978 Kennedy .................. 219/326

FOREIGN PATENT DOCUMENTS

| 1281657 | 10/1968 | Fed. Rep. of Germany . |
| 1579686 | 4/1970 | Fed. Rep. of Germany . |
| 1809665 | 6/1970 | Fed. Rep. of Germany . |
| 1812340 | 6/1970 | Fed. Rep. of Germany . |
| 1809603 | 7/1970 | Fed. Rep. of Germany . |
| 1579836 | 8/1970 | Fed. Rep. of Germany . |
| 1914887 | 10/1970 | Fed. Rep. of Germany . |
| 1679465 | 4/1971 | Fed. Rep. of Germany . |
| 1753211 | 7/1971 | Fed. Rep. of Germany . |
| 1753214 | 7/1971 | Fed. Rep. of Germany . |
| 1753246 | 7/1971 | Fed. Rep. of Germany . |
| 1778983 | 8/1971 | Fed. Rep. of Germany . |
| 2114666 | 10/1972 | Fed. Rep. of Germany . |
| 2258755 | 6/1974 | Fed. Rep. of Germany . |
| 2402497 | 7/1975 | Fed. Rep. of Germany . |
| 3011434 | 10/1981 | Fed. Rep. of Germany . |
| 1429176 | 1/1966 | France . |
| 1434485 | 2/1966 | France . |

Primary Examiner—Anthony Bartis
Attorney, Agent, or Firm—Holman & Stern

[57] ABSTRACT

A heat accumulator is disposed in heat exchange relationship with a heating system. The accumulator includes a body of a material having a high heat capacity and a high melting point, such as iron or ceramic material. The accumulator is arranged for being heated by electrical energy during non-peak hours, or "night" energy, to a temperature much higher than the maximum temperature of the heating system. A conduit containing a fluid in a liquid phase is arranged for communication with the water system for setting the heat accumulator in heat exchange relation with the water system of the heating system. A pump is used on startup at high speed to expel water vapor from the accumulator quickly, with the pump having a reduced speed for ordinary operation following startup. The higher pump speed and low conduit volume in the heat accumulator prevents flashing of the water into water vapor during startup operation.

7 Claims, 15 Drawing Figures

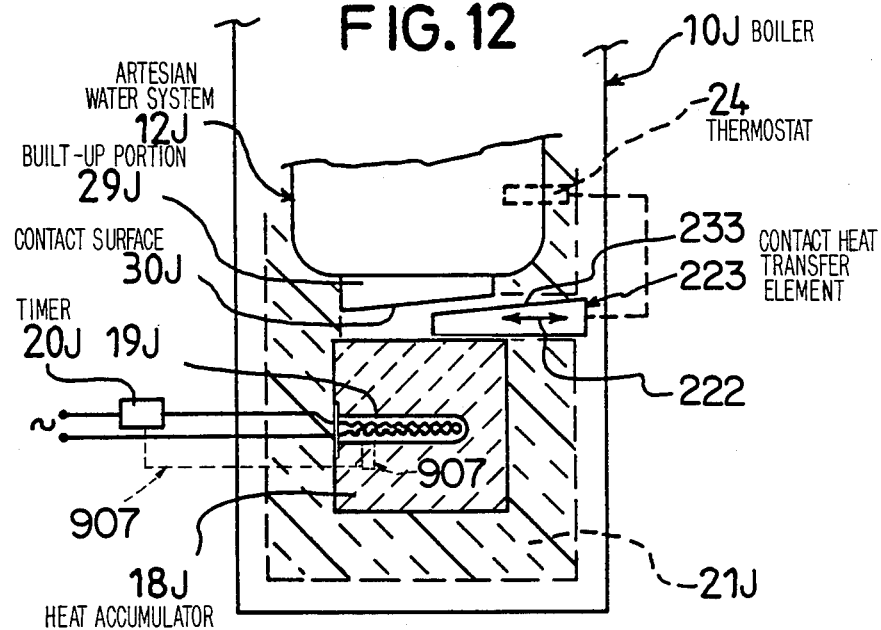
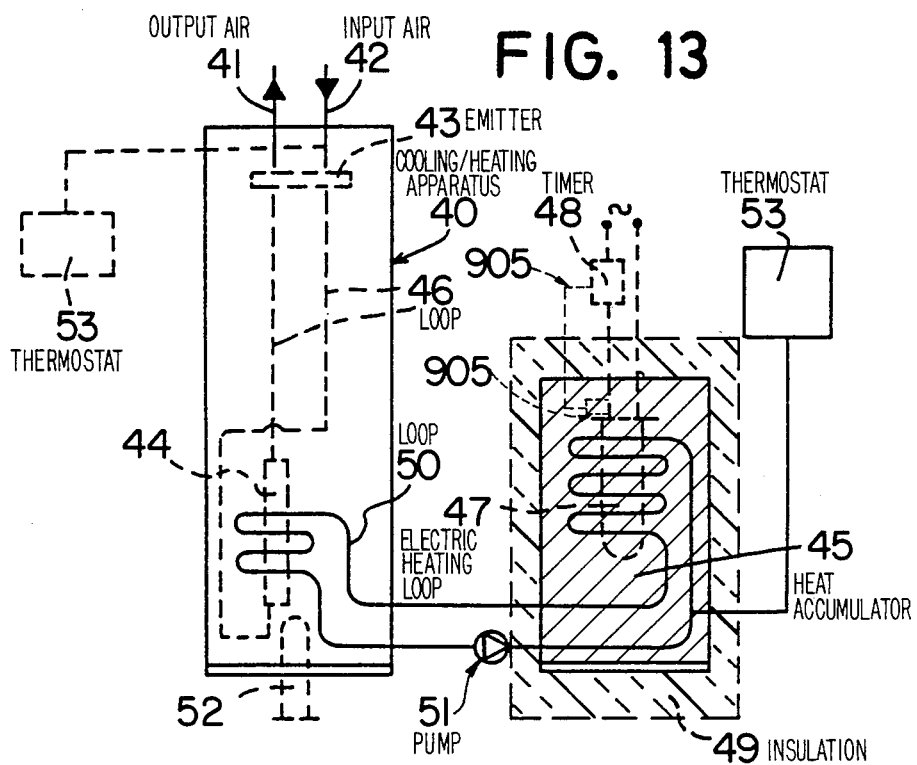

HEAT ACCUMULATOR

BACKGROUND OF THE INVENTION

The present invention relates to a heat accumulator and more precisely to an accumulator of the type that is arranged in heat exchange relation with a heating system for transferring energy to said system.

The problem behind the invention is to accomplish an accumulator that is of reasonable dimensions and is easily adaptable/insertable to/into existing heating boiler constructions and is suitable for series production by established techniques.

Of course, the need for reduction of energy costs has been recognized and there have been long proposed for instance a number of heating systems using relatively cheaper night energy. Such a known solution makes use for instance of a water tank as a storing vessel. In order to provide an energy storing capacity at a reasonable level, bulky, space and cost demanding constructions are required. Other known constructions are also based on complex arrangements which are expensive and constitute less desirable solutions to the problem of using cheap night energy.

According to the prior art, there has been proposed what might appear to be a simple and obvious solution of the problem by combining known material types or modern equivalents thereof with modern heating boiler constructions, implying among other things that the energy storing capacity of the material is "upgraded". The term storing capacity means energy storing capacity expressed as the product of heat capacity, maximum temperature and weight of the storage material.

SUMMARY OF THE INVENTION

Having this in mind, the present invention provides, in the broadest sense thereof, a heat accumulator arranged in heat exchange relation with a heating system. The accumulator comprises a body of a material having a high heat capacity and a high melting point, for instance cast iron, ceramic material, etc., and the body is arranged for being heated by electric energy to a temperature considerably higher than the maximum temperature of the heating system.

The heat accumulator is arranged in heat exchange relation with the water system of the heating system, and the heat exchange between the accumulator and the water system is accomplished by using a conduit containing fluid in liquid phase, for instance water, communicating with the water system.

The most preferred embodiment at present makes use of an open conduit containing water in direct communication with the water system.

In another embodiment where the heating system comprises a heating boiler, the heat exchange conduit preferably is a closed loop where the fluid circulates by controlling a circulation pump, the suction side of which communicates with an expansion vessel, preferably vented to the atmosphere.

The circulating heating system water is hereinafter referred to as "artesian water". The control device of the pump preferably comprises a thermostat and/or a thyristor device for sensing the temperature of the artesian water of the water system of the heating boiler and/or at the input of the loop and/or output from the artesian water system.

In an alternative embodiment where the heating system comprises a heating boiler, the heat exchange between the accumulator and the artesian water is accomplished by using a conduit containing a fluid having a high boiling point, for instance lubricant oil, in communication with the artesian water system.

In the most preferred embodiment, the heat accumulator body is arranged for being heated to said high temperature by using electric night energy.

The heat exchange conduit preferably is arranged as a loop wherein the fluid circulates by controlling a circulation pump.

The control device of the pump preferably comprises a thermostat for sensing the temperature of the water system.

In still another embodiment of the invention where the heating system comprises a heating boiler, the heat exchange between the accumulator body and the artesian water system is accomplished by a device for contact heat transfer between the body and the artesian water system of the heating boiler.

In the most preferred embodiment, the heat accumulator body is arranged for being heated to said high temperature by using electric night energy.

In one embodiment, the contact heat transfer device comprises an element which is insertable to an operative position between a contact surface of the body and a heat absorbing surface of the water system.

In another embodiment, at least one heat absorbing surface of the artesian water system is settable to and from, respectively, an operative heat transfer position relative the accumulator body.

In the latter embodiment, preferably the heat absorbing surface of the artesian water system is shiftable vertically.

A thermostat device preferably is arranged for sensing the temperature in the water system and controlling the heat transfer between the accumulator body and the water system.

In one embodiment, the element to be inserted into an operative position between the contact surface of the body and the heating surface of the artesian water comprises a first heat conducting element, for instance of copper, and a second heat insulating element, for instance of ceramic, so arranged that each one of the elements may be brought into direct contact with said surfaces.

In a further embodiment, at least one of said surfaces is a planar surface and the contact heat transfer element is arranged for wedge contact with said surface.

The invention also provides a heat accumulator arranged in heat exchange relation with a cooling/heating machine, for instance of the absorption type, for transferring energy to said machine.

The heat accumulator comprises a body of a material having a high heat capacity and a high melting point, for instance cast iron, and arranged for being heated by electric energy. The arrangement is characterized in that the body is arranged in heat exchange relation with a cooling/heating machine and arranged for being heated to a considerably higher temperature than the temperature in the accomodation the machine has to serve.

The heat exchange between the accumulator and the cooling/heating machine preferably is obtained by using a conduit containing a fluid having a high boiling point, for instance lubricant oil, high pressure water vapor or medium pressure water vapor, sodium, mercury or other fluid having corresponding characteristics and communicating with the collector element of the heating machine.

Versions where contact heat transfer is used are also possible.

In the most preferred embodiment, the heat accumulator body is arranged for being heated to said high temperature by using electric night energy.

The heat exchange conduit preferably forms a closed loop in which the fluid circulates by controlling a circulation pump.

The control device of the pump preferably comprises a thermostat for sensing the temperature in the return conduit to the emitter side of the machine.

The invention also provides a heat accumulator arranged in heat exchange relation with the artesian water of a heating boiler, comprising a body of a material having a high heat capacity and a high melting point, for instance cast iron, ceramic, etc., where the body is arranged for being heated by electric night energy to a temperature considerably higher than the maximum temperature of the artesian water system. The accumulator body comprises at least two sub-blocks between which a plate having a good heat conducting capacity, for instance copper, is inserted.

On said at least one plate there are arranged pipes, forming part of a conduit communicating with the artesian water system of the heating boiler.

The accumulator body is for instance manufactured from a ceramic material having approximately the following composition, measured in % - by weight, 37% $Al^2O^3$, 5% $SiO^2$, 17% $Fe^2O^3$, 1.7% $TiO^2$, 38% CaO, 0.5% MgO and 0.8% alkaline agents.

BRIEF DESCRIPTION OF THE DRAWINGS

The invention will now be described by reference to the accompanying drawings, where FIG. 1 schematically shows a heat accumulator according to the invention in open, direct communication with the artesian water system of a heating system/heating boiler, FIG. 2 schematically shows another type of electric heating boiler, FIG. 12 shows a "horizontal" version having a wedge shaped contact heat transfer element, FIG. 13 schematically shows an embodiment applied to a cooling/heating machine.

DETAILED DESCRIPTION OF THE INVENTION

Figure 1:
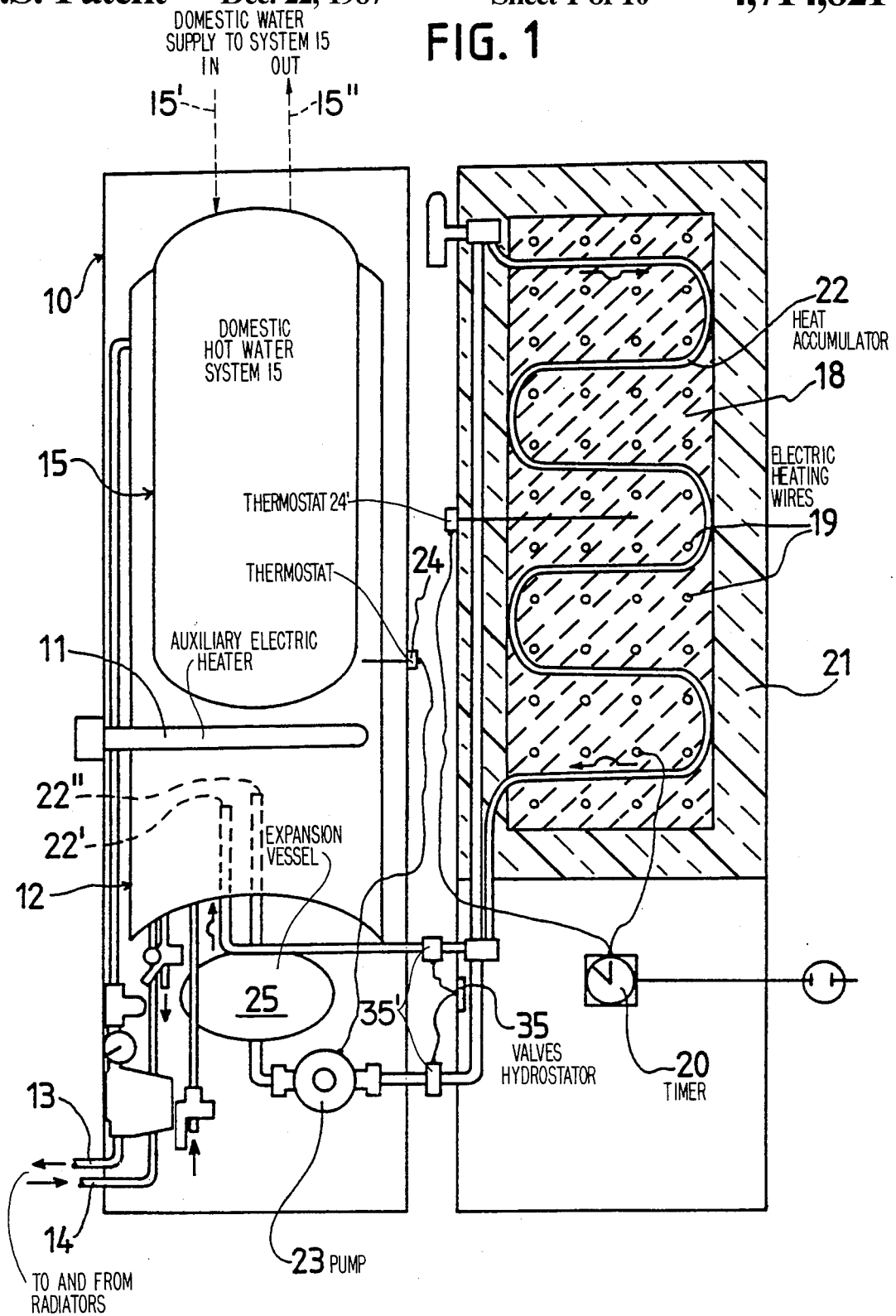

The heating boiler indicated by the reference numeral 10 in FIG. 1 is an electric heating boiler. In the prior art versions, such a boiler is of a type where an electric heating cartridge 11 accomplishes the heating of the water in the artesian water system 12. Conduits to and from the radiators have been denoted 13 and 14. The domestic hot water system 15, having an inlet 15' and outlet 15", may be heated from a surrounding system 12 or provided with a separate heating cartridge (not shown).

The boiler in FIG. 1 has a separate heat accumulator body 18 of a material having high heat storing capacity, for instance of cast iron or ceramics material, for example of a type comprising $Al^2O^3$, $SiO^2$, $Fe^2O^3$, $TiO^2$, CaO, MgO and alkaline agents in the amounts of 37%, 5%, 17%, 1.7%, 38%, 0.5%, and 0.8%, respectively, measured by weight. The effective heat capacity of a body of said ceramic material of a size approximately $40 \times 40 \times 80$ $cm_3$ may be estimated to be 50 kcal at a temperature of around 400° C. The energy corresponds roughly to the energy need of an ordinary one family house on an ordinary winter day. The accumulator element 18 preferably should be placed at a higher level than the lowest water level of the boiler. Such an arrangement allows elimination of check valves.

An electric wire heating arrangement 19, comprising for instance "KANTHAL" wires, has a number of wire resistor elements connected in series and which are inserted in the electrically non-conducting accumulator body 18. The arrangement of electric wires connected in series allows a lower voltage in each section and a higher heat dissipation. The electric heating wires 19 may for instance in total dissipate 9 kW, i.e., i.e., between 10 p.m. and 5 a.m. such an arrangement of wires provides 63 kW, i.e.h supplied energy. The heating wires, for instance of the "KANTHAL" type, may be of relatively large diameter. The operation of the heating wires 19 preferably is controlled by a timer 20 and a thermostat.

There is a thick insulation 21 around the heat accumulator body 18, which is preferably provided with a heat reflecting surface layer/coating. In the body 18 there is built in or inserted a pipe conduit 22, containing a fluid, for instance water. The pipe 22 provides for heat exchange relation between the body 18 and the artesian water system 12 when a circulation pump 23 is activated, preferably controlled by a thermostat 24 in the system 12 and/or a thyristor controlling the circulation speed of the pump in relation to the temperature at the input to the pipe conduit 22 or the temperature difference between the input and output.

The pipe conduit 22 is open and has ends 21', 22' placed in the artesian water system 12. The pump may be of the double-winding type starting at a higher rpm and running at a lower rpm after a predetermined time.

In the accumulator there will remain vapor of a pressure corresponding to the pressure head established by the expansion vessel 25. The water vapor is dry and unsaturated, and itself forms an excellent heat insulating medium and prevents self circulation.

When the pump thereafter obtains a start signal, there exists water which is directly on the suction or pressure side of the pump. The conduit 22 has a relatively small internal volume, permitting rapid filling by liquid water upon start-up of the pump. As the pump starts with full effect and high speed, the vapor is forced out of the conduit 22 immediately and is transformed thereafter by condensation into water which then circulates in the direction indicated by the arrows in FIG. 1. The pump preferably returns quickly from an initial starting speed to a predetermined lower circulation speed.

A relatively high pump speed is necessary to immediately fill the conduit 22 and to expel the water vapor from the conduit 22. At a lower water speed, the water entering conduit 22 would flash into water vapor. It is well known that boiling heat transfer is by far the most efficient form of heat transfer, and therefore, the present invention, by maintaining a very high initial pump speed, forces a sufficient amount of water into the conduit 22 to carry away heat absorbed by the water during passage through the conduit 22, without flashing completely into water vapor. Water vapor has insulating properties, and thus the flashing of the water into water vapor within the conduit 22 upon initial startup would lower the efficiency of the device during this startup interval. By the very rapid passage of water into the conduit 22, water replaces the water vapor which had previously occupied the conduit 22, and the conduit 22 cools to a sufficient degree to prevent flashing of water into vapor by virtue of the heat absorption of the flowing water, so as to permit pumping operation at a significantly lower pump speed without the water within the conduit 22 flashing completely into steam.

In the event that the accumulator body 18 would be of an act as a spare/auxiliary unit.

The pipe conduit 22 as well as the artesian water system 12 communicates with an expansion vessel 25 as seen in FIG. 1.

The suction side of the pump 23 communicates with the expansion vessel 25, which is ventilated to the environment, and a sufficient amount of water should be made available to permit operation of the pump 23. Valves 35' are preferably arranged for preventing unintentional communication between the water supply in the vessel 25 and the pipes/loops in the heat accumulator body 18. The valves 35' close automatically upon any current/voltage breakdown, or when any pipe in the heat accumulator starts leaking for any unexpected reason. In the latter event, a hydrostator 35 (an element sensing moisture) operates the valves 35'.

When the correct temperature, for instance 70° C., has been transmitted in the heating boiler, a signal is obtained from the thermostat 24 and/or thyristor, and the pump 23 is stopped. In the pipe 22 of the accumulator body the water expands during vapor formation into the boiler and/or the expansion vessel 25. There will be no self circulation in the system, instead an equilibrium state will be attained where the dry vapor of moderate pressure will be in balance with the water in the system. In the accumulator there will remain vapor of a pressure corresponding to the pressure head established by the expansion vessel 25. The vapor is dry and unsaturated and forms an excellent heat insulating medium and, as mentioned, prevents self circulation.

When the pump thereafter obtains a start signal, there is water directly on the suction/pressure side of the pump and as the pump starts with full effect and high speed, the vapor is pressed out at once and transformed into water which circulates in the direction indicated by the arrows. As mentioned, the pump preferably is thyristor controlled and returns quickly to a circulation speed preferably related to the temperature difference between the input to and output from the boiler, meaning that the circulation speed is variable within a wide range. The pump may also be of the type comprising twin windings, i.e. a pump starting with a high speed and automatically, for instance after one minute, slowing down to a lower speed.

If the temperature of the artesian water system is 70° C., the temperature in the pipe loop outside the accumulator does not have to exceed 80° C.

Figure 2:
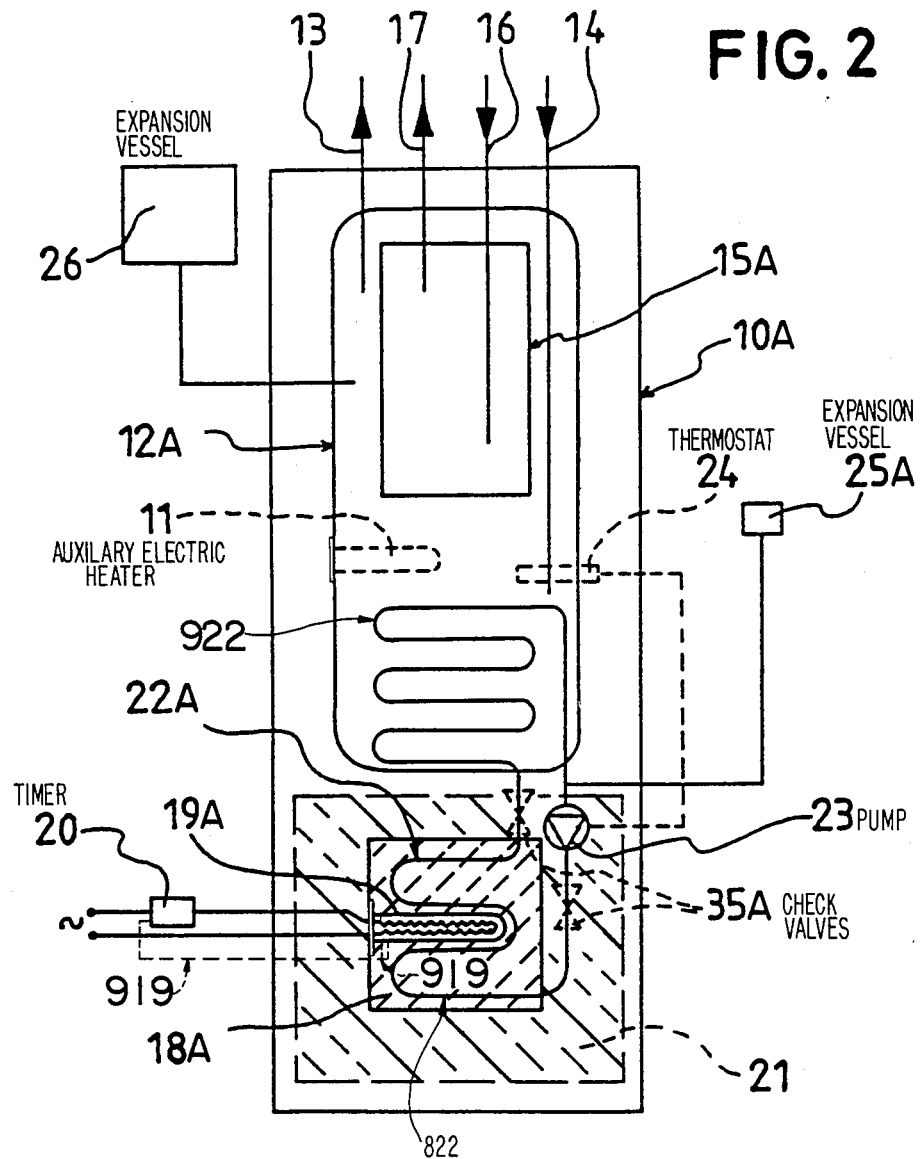

The heating boiler indicated by the reference numeral 10A in FIG. 2, externally and as far as the water system is concerned, is a conventional electric heating boiler. In known versions the heating boiler type is such that an electric heating cartridge 11 takes care of the heating of the water in the artesian system 12A. Conduits to and from, respectively, the radiators have been denoted by 13 and 14. The domestic warm water system 15A may be heated from the surrounding system 12A or have a separate heating cartridge (not shown). Conduits to and from, respectively, the warm water vessel 15A have been identified by the numerals 16 and 17.

At the lower end of the heating boiler in FIG. 2 there is a heat accumulator body 18A of a material having a high heat storing capacity, for instance cast iron or ceramic material, for example of the type discussed with reference to FIG. 1.

An electric heating loop 19A formed by an electric cartridge is inserted in the accumulator body 18A and may for instance dissipate 9 kW, i.e. between 10 p.m. and 5 a.m. such a cartridge dissipates 63 kWh of supplied energy. The switching to and from the loop 19A preferably is controlled by a timer 20 and thermostat 919.

Figure 6:
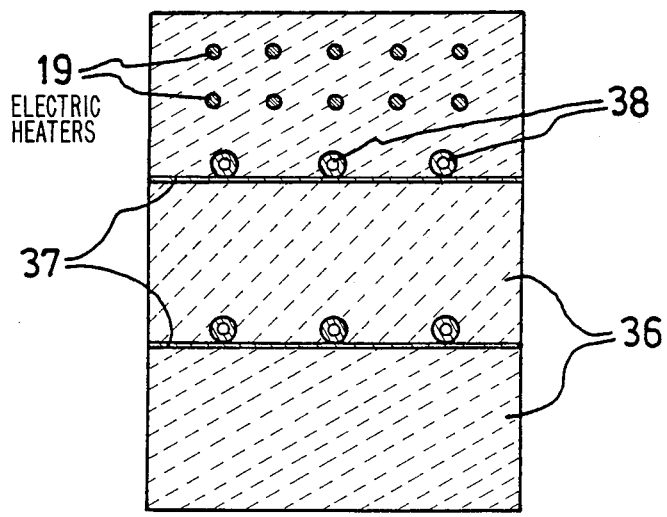
FIG. 6 shows an accumulator body consisting of several sub-blocks.

There is a thick insulation around the heat body 18A, and is preferably also provided with a heat reflecting surface layer/coating. In the body 18A, there is built in or inserted a closed pipe loop 22A containing a fluid, for instance water. The loop 22A sets the body 18A in heat exchange relation with the artesian water system 12A when a circulation pump 23 is activated, preferably under the control of a thermostat 24 in the system 12A and/or a thyristor (as seen in FIG. 6) controlling the circulation speed of the pump by sensing the temperature at the input to the loop 22A or by sensing the temperature difference between the input and output.

In the event that the accumulator body 18A would not have a sufficient heat storage capacity, an electric cartridge 11 is provided to act as a spare/auxiliary unit.

The water loop 22A, as well as the artesian water system 12A, communicates with expansion vessels 25, 26 in FIG. 2. A portion 922 of the loop 22 is disposed in the tank 12A and another portion 822 is disposed in the storage mass of the body 18A. It is also possible to use the cartridge 19A for direct heating of the water in the loop 22A. A thermostat 919 controls power to cartridge 19A.

The suction side of the pump 23 communicates with the expansion vessel 25A which is vented to the environment and which includes a sufficient amount of water for the purposes described above. Check valves 35A are preferably arranged for preventing any unintentional communication between the water supply of the vessel 25A and the loops in the heat accumulator 18A.

When the correct temperature, for instance 70° C., has been reached in the heating boiler, a signal is transmitted from the thermostat 24 and/or the thyristor to signal the pump 23 to stop. The check valves 35A block the water supply from the expansion vessel 25A to the accumulator 18A. In the accumulator 18A there will remain vapor of a pressure corresponding to the height of the expansion vessel 25A.

When the pump thereafter receives a start signal, water is present directly on the suction/pressure side and as the pump starts with full effect and high speed, the vapor is pushed out rapidly. As mentioned, the pump preferably is thyristor controlled and returns to a circulation speed variable within wide limits and preferably controlled by the temperature difference between the input to and output from the heating boiler.

If the temperature of the artesian water system is 70° C., the temperature in the pipe loop outside the accumulator does not need to exceed 80° C.

Figure 3:
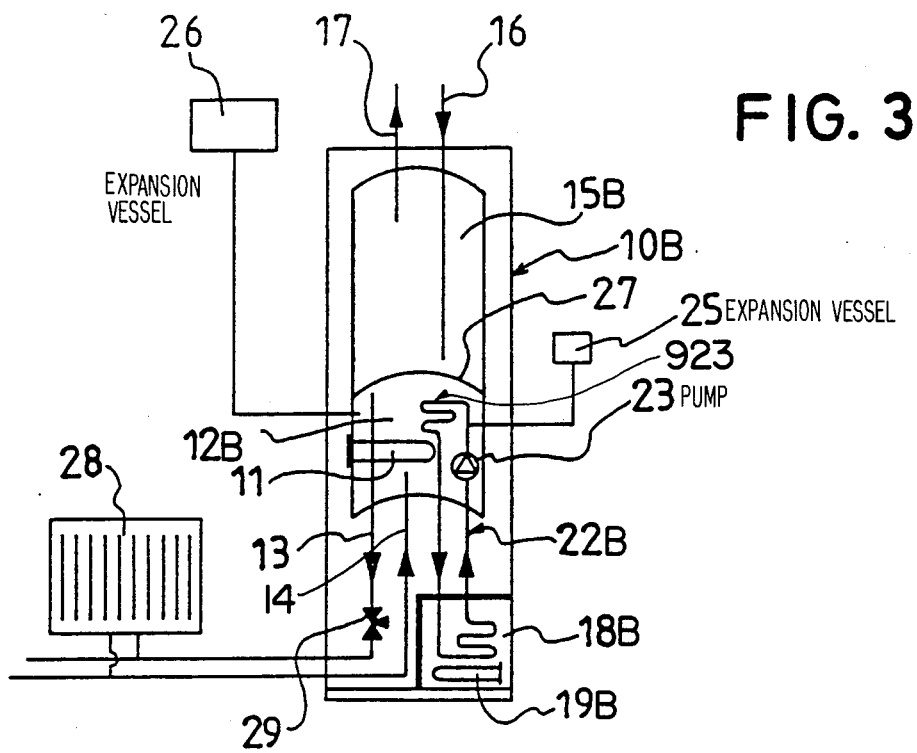
FIG. 3 shows another alternative embodiment.

In FIG. 3 there is shown a heating boiler where the accumulator element 18B serves the artesian water system 12B basically in the same manner as in FIG. 1, but where the artesian water system 12B and the domestic water system 15 are separated by a partition wall 27 extending across the heating boiler. In FIG. 3 there has been shown also a radiator 28 and a shunt valve 29 of known type. A portion 923 of coil 22B is disposed in the tank 12B.

Figure 4:
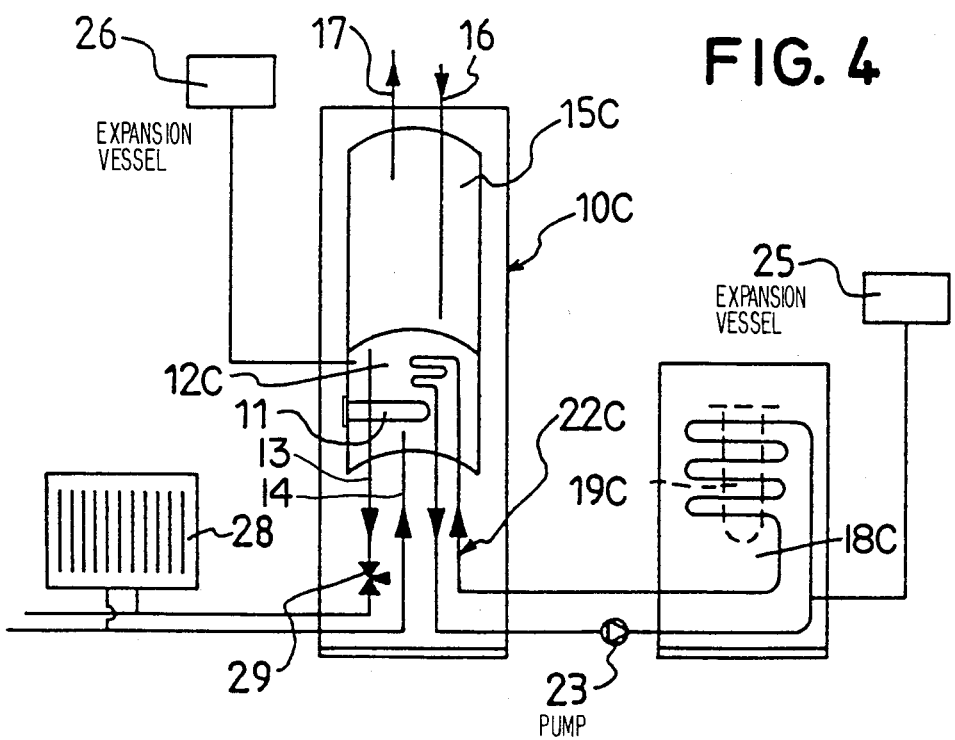
FIG. 4 shows an accumulator element as a separate unit in a heating boiler construction generally similar to the one in FIG. 2, FIG. 5 schematically shows a method for manufacturing of an accumulator block from two halves provided with channels.

The arrangement in FIG. 4 differs from the previous ones in that the heat accumulator body 18C is placed as a separate unit outside the actual heating boiler 10C. For the rest, the principle for the heat exchange is the same.

Figure 5:
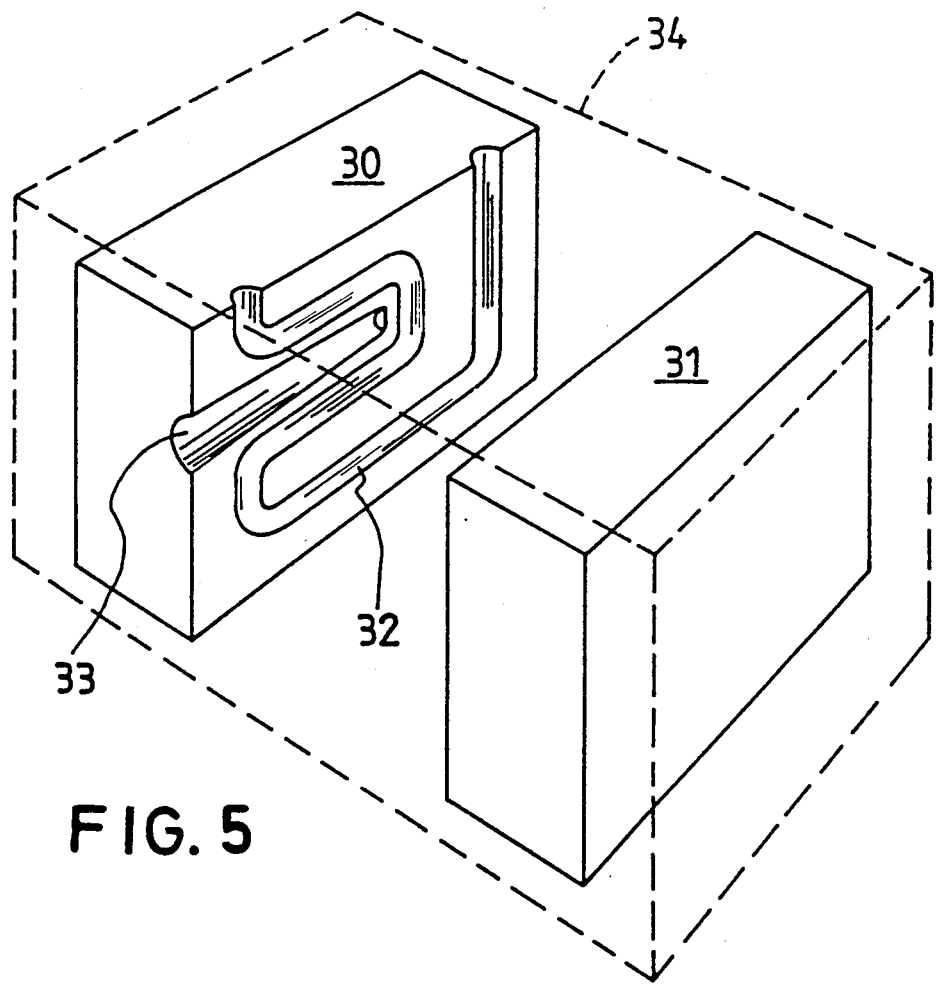

In FIG. 5 there is shown schematically how two blocks 30 and 31 (one having grooves 32, 33 formed therein corresponding to the loop 22 placeable therein and the electric cartridge 19) are arranged for being brought together, for instance in a metal box 34 which thereafter is provided with connection pieces and insulation and installed in the heating boiler or arranged as a separate unit.

In FIG. 6 there is shown an accumulator body comprising several sub-blocks 36, for instance of the previously mentioned ceramic material. The sub-blocks are separated by plates 37, for instance of copper. On the plates 37 there are pipes 38, preferably also of copper, attached for instance by soldering, riveting, etc., and forming part of the fluid system. The plates 37 promote the heat transport to the fluid in the pipe 38 and compensate for any defects in the contact heat transfer between adjacent blocks. It is also assumed that the plates tend to counteract fatigue and cracking due to cyclical expansion and contraction due to heating and cooling cycles in the areas of the pipes.

In FIG. 6 the heat cartridges 19 are spread out in respective blocks. Other arrangements are possible, and the elements/cartridges may for instance be attached to the same plate as the pipes 38.

Figure 7:
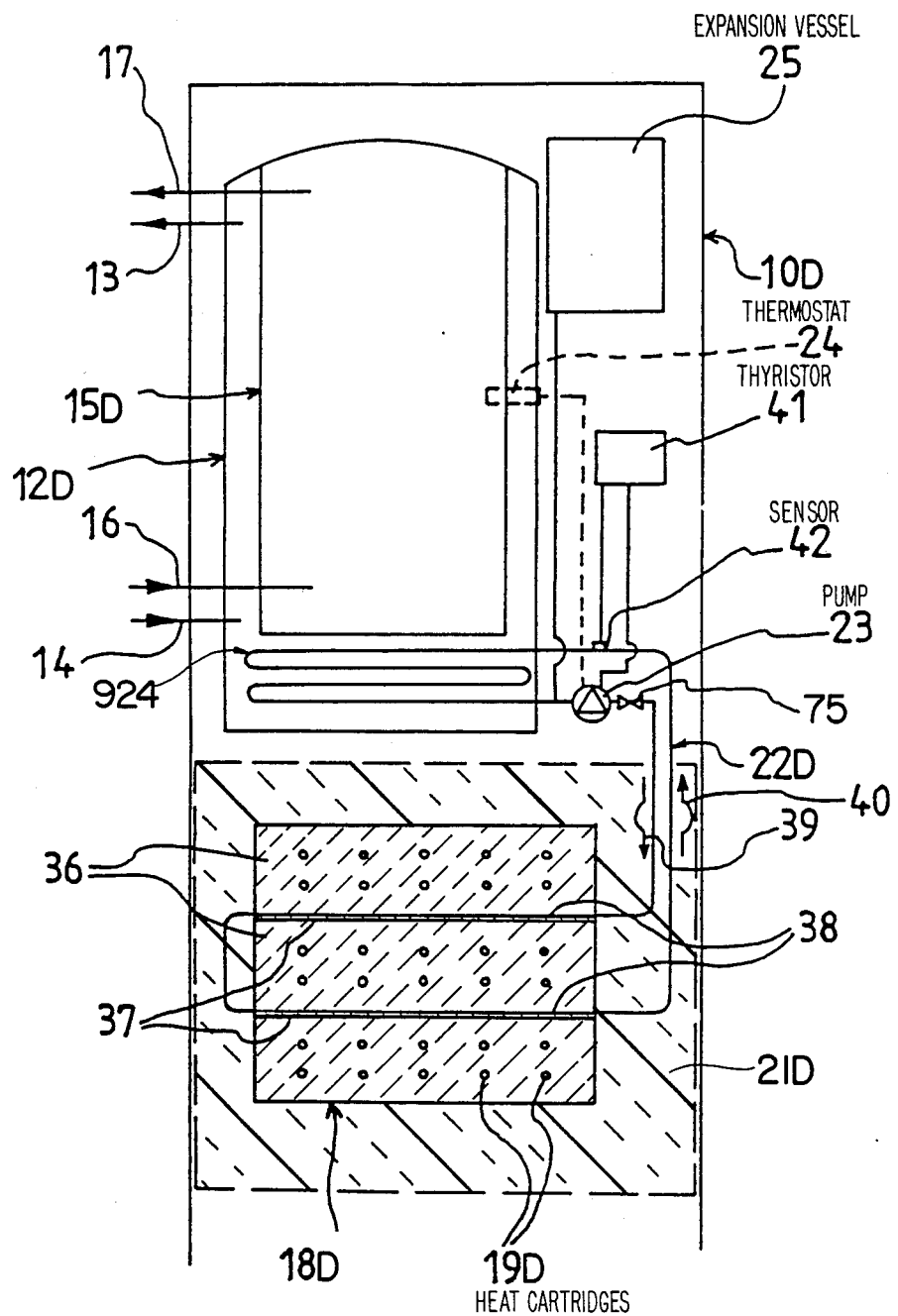
FIG. 7 shows a body as in FIG. 6 inserted in a double sleeved boiler, FIG. 8 schematically shows a further type of electric heating boiler.

In FIG. 7 there is shown a heating boiler comprising an accumulator body 18D consisting of three sub-blocks 36 which are separated by copper plates 37 forming heat conducting bridges. On said plates 37 there are pipes 38 attached by rivets, or in any other suitable manner and forming part of the fluid circulation loop 22D. A portion 924 of loop 22D is disposed in tank 12D.

The circulation direction in the loop 22D is indicated by the arrows 39, 40. The circulation pump 23 has a thyristor device 41 which controls the speed of the pump 23 continuously and within wide limits under the control of a signal from a sensor 42 at the input to the loop system within the artesian water system of the heating boiler.

The expansion vessel 25D, which is ventilated to the environment, feeds the suction side of the pump with water. The vapor, having a pressure corresponding to the height of the expansion vessel, that might be formed in the loop part between the check valve 75 and the loop part within the artesian water system 12D in the heating boiler, during the inoperative period of the pump, is easily pushed out through the expansion vessel when the pump is started again.

Figure 8:
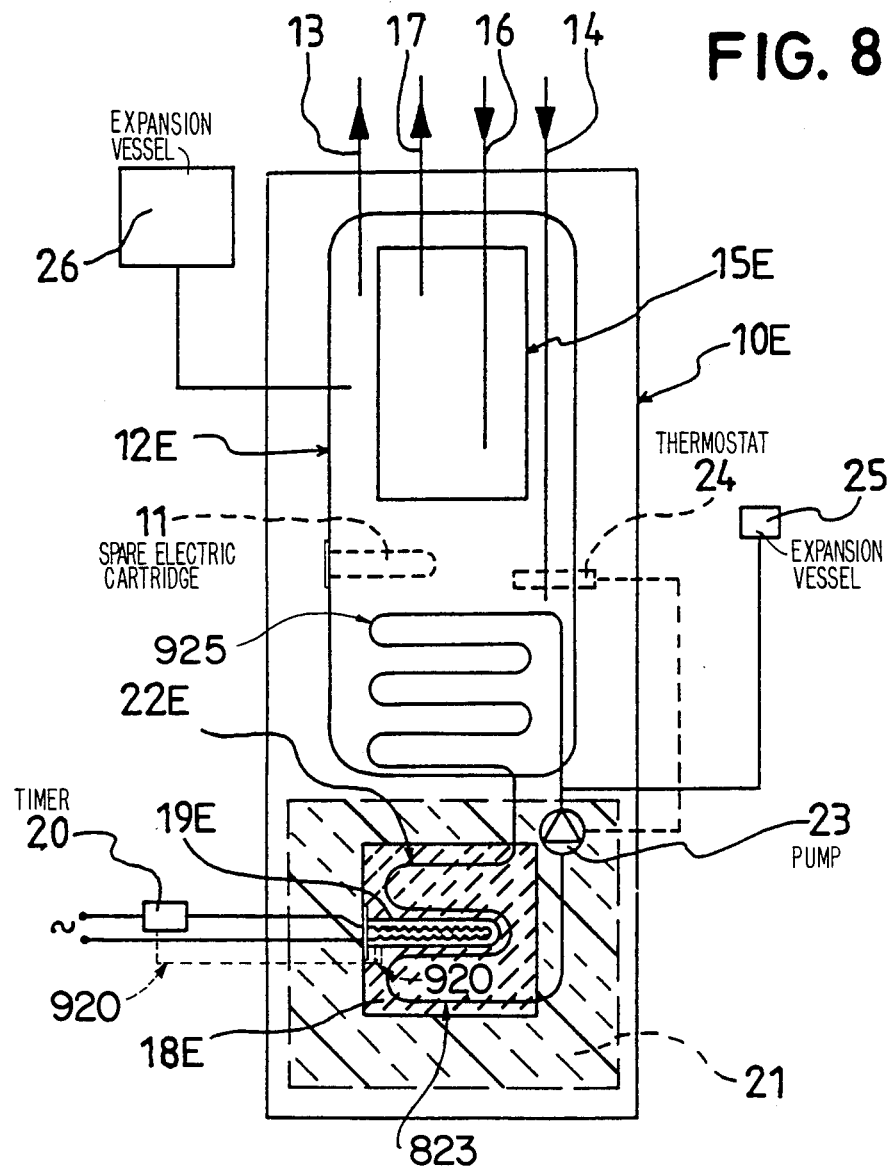
Figure 9:
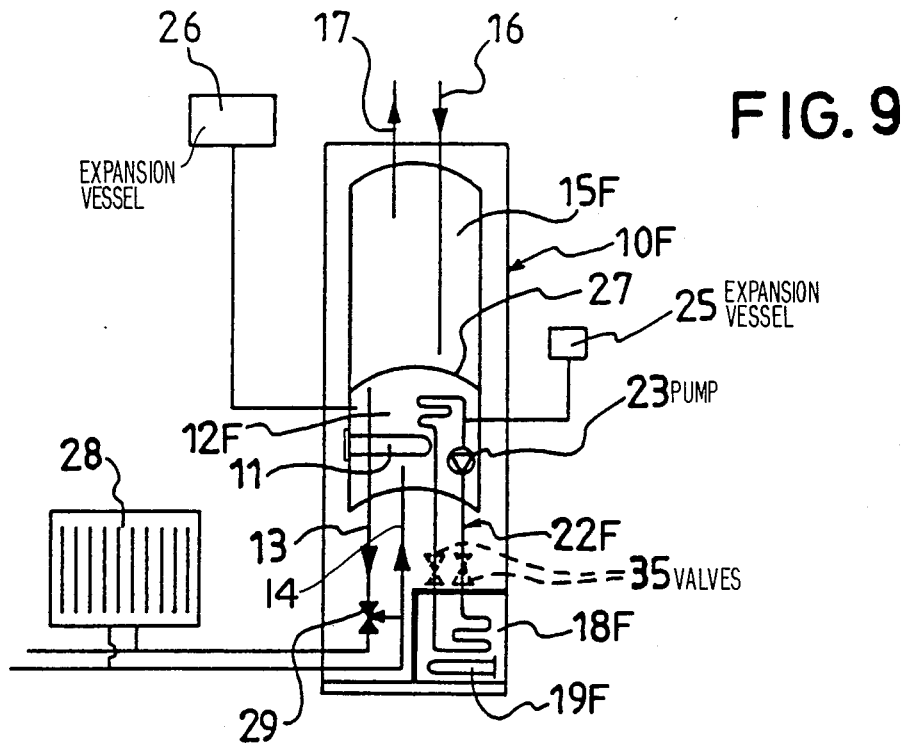
FIG. 9 shows an alternative embodiment similar to that of FIG. 8.
Figure 10:
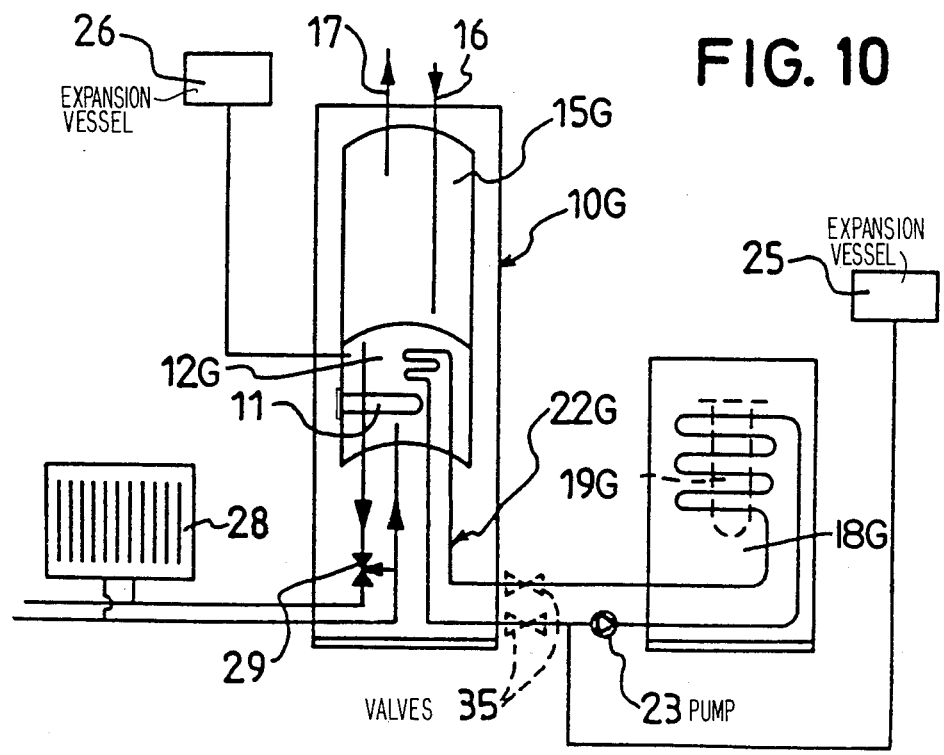
FIG. 10 shows an accumulator element as a separate unit in a heating boiler construction generally similar to that of FIG. 9, FIG. 11 schematically shows contact heat transfer in a "horizontally" and a "vertically" operating contact heat device, FIG. 11a schematically shows an arrangement of heat pipes inserted in the accumulator body.

FIGS. 8–10 are substantially similar to respective ones of FIGS. 2–4. The embodiment shown in FIGS. 8–10 have an oil based heat transfer system, while in FIGS. 2–4 a water based heat transfer system is used. Thus, the differences between these groups of figures is in the type of fluid used for heat exchange.

The heating boiler shown by the reference numeral 10E in FIG. 8 is an electric heating boiler. In known versions said heating boiler type comprises an electric heating cartridge 11 for heating the water in the artesian water system 12E. Conduits to and from, respectively, the radiators have been denoted by 13 and 14. The domestic warm water system 15E may be heated from the surrounding system 12E or have a separate heating cartridge (not shown). Conduits to and from, respectively, the warm water vessel 15E have been indicated by the numerals 16 and 17.

At the lower end of the heating boiler in FIG. 8, there is a heat accumulator body 18E of a material having a high heat capacity, for instance cast iron. The effective heat capacity of a body of approximately $30 \times 30 \times 30$ $cm^3$ can be estimated to between 20–40 kcal at a temperature of around 400° C., depending on insulation and type of iron or ceramic. The upper limit corresponds well to the storage energy need for a normal one family house.

An electric heating loop 19E formed by an electric cartridge is inserted into the accumulator body 18E and may for instance give 9 kW, i.e., output between 9 p.m. and 5 a.m. such a cartridge dissipates 63 kWh of supplied energy. The switching to and from of the cartridge 19E preferably is controlled by a timer 20 and a thermostat.

There is a thick insulation 21 around the heat body 18E. In the body 18E there is built in or inserted a pipe loop 22E, having a portion 925 disposed within tank 12E, and a portion 823 in the storage mass of body 18E, containing a fluid of a high boiling point, for instance lubricant oil having a boiling point around 450° C. The loop 22E sets the body 18E in heat exchange relation with the artesian water system 12E when a circulation pump 23 is activated, preferably under the control of a thermostat 24 in the system 12E. The very hot oil in the loop 22 will quickly cause attainment of the desired temperature in the artesian water system 12E. In the event that the accumulator body 18E would not have a sufficient capacity, there is also provided an electric cartridge 11 acting as a spare/auxiliary unit.

The oil loop 22E as well as the artesian water system 12E communicate with expansion vessels 25, 26 in FIG. 8. It is also possible to use the cartridge 19E for direct heating of the oil in the loop 22E. A thermostat 920 controls power to cartridge 19E.

In FIG. 9 there is shown a heating boiler where the accumulator element 18F serves the artesian water system 12F basically in the same manner as in FIG. 8, but where the artesian water system 12F and the domestic water system 15F are separated by a partition wall 27 extending across the heating boiler. In FIG. 9 there has also been shown a radiator 28 and a shunt valve 29 of known type.

The arrangement in FIG. 10 differs from the previous one in that the heat accumulator body is placed as a separate unit outside the actual heating boiler 10G. For the rest the principle for the heat exchange is the same.

Figure 11:
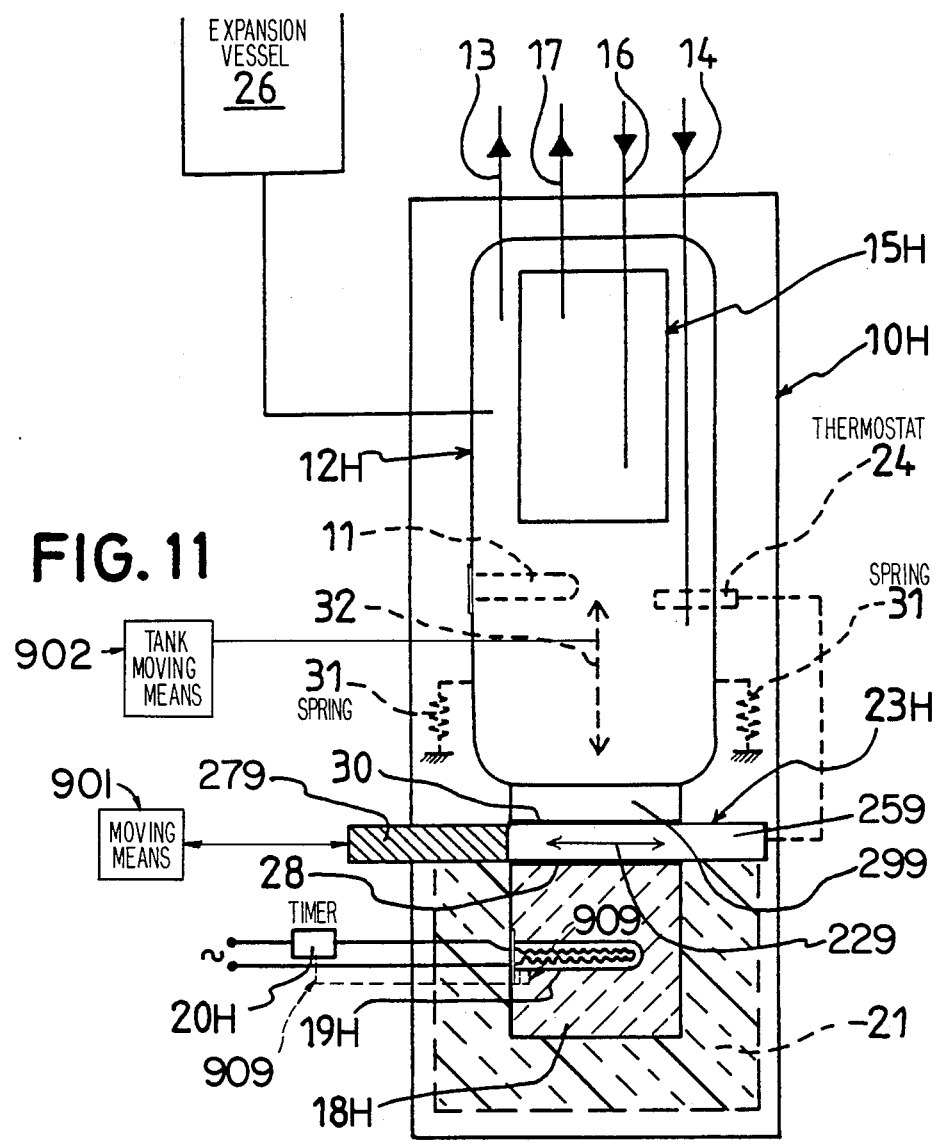

The heating boiler shown by the reference numeral 10H in FIG. 11 is an electric heating boiler. In known versions a heating boiler of this type comprises an electric heating cartridge 11 that heats the water in the artesian water/radiator system 12H. Conduits to and from, respectively, the radiators have been denoted by 13 and 14. The domestic warm water system 15H may be heated from the surrounding system 12H or may have a separate heating cartridge (not shown). Conduits to and from, respectively, the warm water vessel 15H have been denoted 16 and 17.

At the lower end of the heating boiler in FIG. 11 is a heat accumulator body 18H of a material of high heat capacity, for instance cast iron. The effective heat capacity of a body of a size $30 \times 30 \times 30$ cm$^3$ may be estimated to be between 20–40 kcal at a temperature of around 400° C., depending on insulation and iron type. The higher figure corresponds well with the energy storage need for a normal type of one family house.

An electric heating loop 19H in the form of an electric cartridge is inserted in the accumulator body 18H and may for instance dissipate 9 kW, i.e., between 9 p.m. and 5 a.m. such a cartridge dissipates 63 kWh of supplied energy. The switching to and from of the cartridge 19 preferably is controlled by a timer 20 and a thermostat.

There is a thick insulation 21 around the heat body 18H.

An element 23H, moveable by a moving means 901 in the direction of the double arrow 229, basically consists of a planar disc and comprises a first heat insulating portion 259, for instance of ceramic material, and a second heat conducting portion 279, for instance of copper or heating pipes, is shown between the planar upper side 28 of the heat body and a built-up portion 299 which has a good heat conducting capability is arranged at the bottom of the artesian water system and is in heat exchange relation therewith. The built-up portion 299 also comprises a planar heat transfer surface 30.

The movement of the element 23H in the direction of the double arrow 229 is controlled by a thermostat 24 sensing the temperature in the artesian water system. This system communicates in the general manner with an expansion vessel 26. When the portion 279 contacts the surfaces 28 and 30, there is a transport of heat by conduction to the artesian system 12H of the heating boiler 10H. In the event that the accumulator 18H would not be of sufficient capacity, an electric cartridge 11 is provided to act as a spare/auxiliary unit. A thermostat 909 controls power to the cartridge 20H.

Figure 11A:
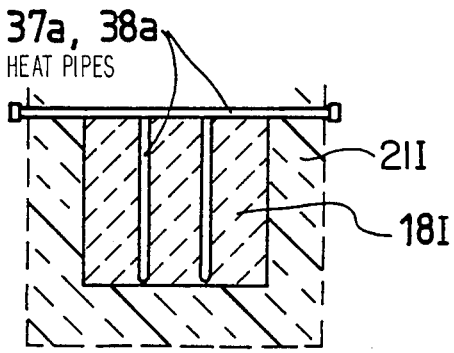

FIG. 11a schematically shows a heat accumulator body 18I equipped with heat conducting plates and/or heat pipes 37a, 38a for the distribution of heat within the body 18I and/or transport of heat to the heating boiler. The heat pipes form an expeditious means for extracting heat from the accumulator 18I. As is well known, heat pipes have a heat conductivity which is up to 10 times higher than that for highly conducting metals.

In FIG. 11 there is also indicated a modified contact heat transfer arrangement, comprising a water system 12H suspended on springs 31 and movable in the direction of the double arrow 32, for instance by an arrangement of electromagnets (shown as means 902).

The element 23H may be eliminated in the latter version, the heat exchange taking place by direct contact between the surfaces 28 and 30. During the charging period of the accumulator an air-gap between the body 18I and the built-up portion 299 must be accepted. The leakage of heat basically will be supplied to the water system 12H, provided the insulation thereof is sufficient.

In FIG. 12 there is shown a further embodiment of the contact heat transfer element 223. The double-headed arrow 222 indicates the permissible motion of element 223. The element is shaped as a wedge, the "oblique" surface 233 of which is arranged for operative, heat transferring engagement with the contact surface 30J of the built-up portion 29J. The contact surface 30J is oblique and adapted to the surface 33J. A thermostat 907 controls power to the cartridge 20J.

In FIG. 13 there is shown generally by the reference numeral 40 a cooling/heating apparatus, for instance of the absorption type. The machine 40 may be an air conditioning unit having an output 41 and an input 42 for air flow from/to the "emitter element" 43 of the machine. By the term emitter element is meant that part of the machine that basically determines the state (temperature) of the accomodation which is served by the machine via conduits 41,42. In analogy herewith, the term collector element 44 means the machine part receiving energy from the heat accumulator 45. The loop 46 between the collector and accumulator basically may represent the arrangement between the collector and the emitter of a heat pump, in well known manner, such a heat pump also including a compressor, venturi valve, etc., in said loop. In another possible version the machine 40 may be a cooling machine of the absorption type.

The heat accumulator body 45 is of a material having a high heat capacity, for instance cast iron. The effective heat capacity of a body having an approximate size of $30 \times 30 \times 30$ cm$^3$ may be estimated to be between 20–40 kcal at a temperature of around 400° C., depending on insulation and type of iron or ceramic material, etc.

An electric heating loop 47 formed by an electric cartridge is inserted in the accumulator body 45 and may dissipate 9 kW, i.e. between 9 p.m. and 5 a.m. such a cartridge dissipates 63 kWh of supplied energy. The switching to and from of the cartridge 47 preferably is controlled by a timer 48 and thermostat 905.

A thick insulation 49 is disposed around the heat body 45, preferably provided also with a heat reflecting surface layer/coating. In the body 45 there is built in or inserted a pipe loop 50 containing a fluid, for instance water or other fluid having a high boiling point, for instance lubricant oil having a boiling point of 450° C. High pressure water vapour and metals such as sodium or mercury are also possible. The loop 50 sets the body 45 in heat exchange relation with the collector element 44 when a circulation pump 51 is activated, preferably under the control of a thermostat 57 in the return conduit 42. The temperature within the accomodation to be heated, broadly, will coincide with the air temperature in the return conduit 42. The very hot oil in the conduit 50 will quickly give the desired temperature at the collector element 44. When water is used as a heat carrier, the same circulation principles as previously described are applicable. In the event that the accumulator body 45 would not have a sufficient capacity, there is also an electric cartridge 42 acting as a spare/auxiliary unit.

The oil loop 50 communicates with an expansion vessel 53. It is also possible to use the cartridge 47 for direct heating of oil in the loop 50.

Figure 14:
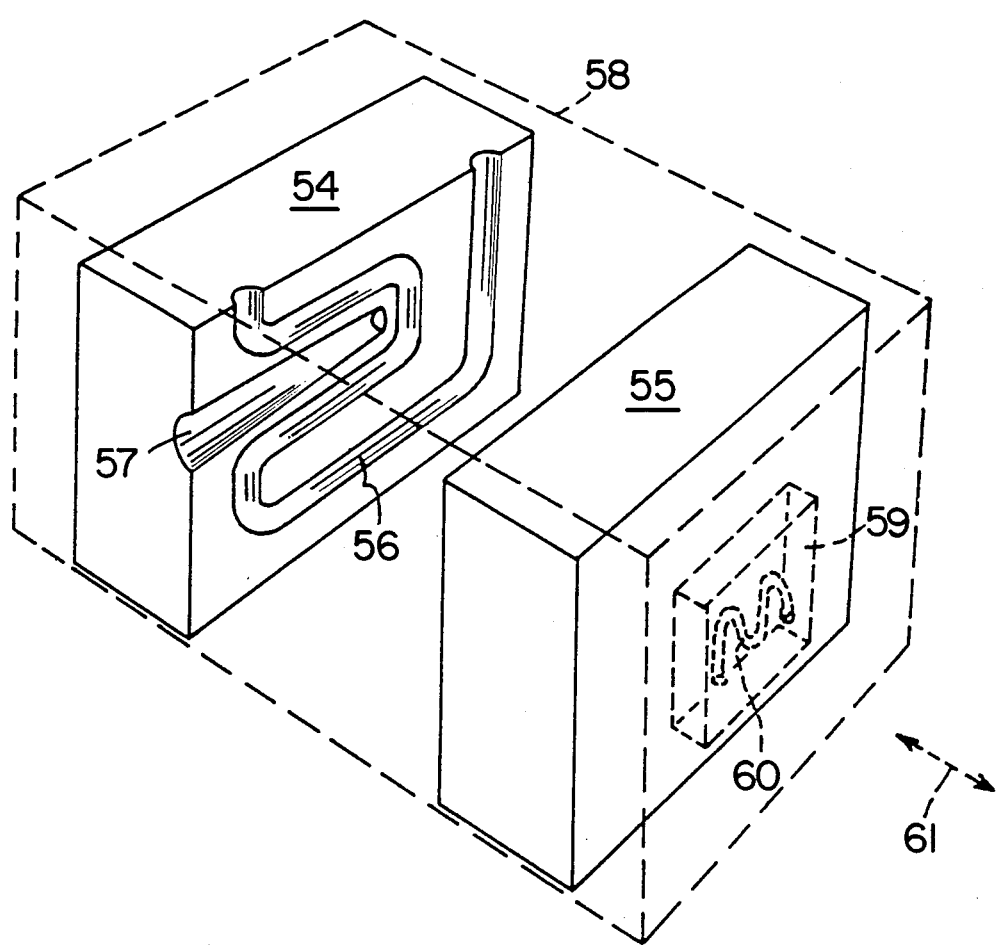
FIG. 14 shows a couple of accumulator body elements.

In FIG. 14 there is schematically shown how two cast iron blocks 54,55 (one having grooves 56,57 formed therein corresponding to the particular loop which is to be placed in either the body 45 or the electric cartridge 11) are arranged for being put together, for instance in a metal box 58, which thereafter is provided with connection pieces and insulation.

In FIG. 14 there is shown a built-up portion 59 on one of the cast iron halves 55. In the portion 59, which is of a good heat conducting material, there are formed grooves 60. The idea is that the collector element 44 of the heating/cooling machine 40 shall be settable to and from, respectively, heat transfer contact by movement in the direction of the double arrow 61. If the heat transfer is accomplished entirely by contact heat transfer, the groove 56 is of course superfluous and in such a case the body 45 may be a one piece body.

Although specific embodiments have been described, it is realized that modifications and alternatives of course are possible within the scope of the accompanying claims.

It is for instance within the scope of the invention to use so called heat pipes for supporting the transfer and distribution of heat within the accumulator body and also for transfer to the accumulator body. Such heating pipes may with advantage be attached to plates within the accumulator body.

I claim:

1. A heating system comprising a heat accumulator arranged in heat exchange relation with a heating boiler containing a fluid having a relatively low boiling point to be heated for use, said heat accumulator comprising a body of a material having a high heat capacity and a high melting point which is arranged for being heated by electric energy to a temperature considerably higher than the maximum temperature of said boiler, and an electric heating means for heating said body; said body including a conduit containing a fluid in a liquid phase having a relatively low boiling point; the fluid in said conduit being arranged in heat transferring communication with the fluid in said boiler for heating said boiler fluid; and a circulation pump having the suction side thereof in communication with an expansion vessel and said boiler, said expansion vessel being vented to the atmosphere; means responsive to the temperature of the fluid in said boiler for controlling the starting and stopping of said pump; said conduit having a predetermined volume which is relatively small as compared to the capacity of said pump; said pump having a relatively high initial startup speed to initially drive any vaporized fluid out of said conduit, and being designed and arranged to return to a relatively lower, second speed for normal operation after said initial startup; and said pump being stopped if a predetermined temperature is reached in said boiler thereby creating in said conduit of said body of said heat accumulator dry vaporized fluid of moderate pressure as established by said expansion vessel.

2. An accumulator according to claim 1, wherein said circulation pump is disposed at the lowest level of said fluid in said conduit.

3. An accumulator according to claim 1, wherein said fluid in said boiler and said fluin in said conduit comprises water, and wherein said conduit is an open conduit containing said water in direct communication with said water in said boiler.

4. An accumulator according to claim 3, wherein said control means for controlling the stopping and starting of said pump includes a thermostat and a thyrister device sensing the temperature in said heating boiler.

5. An accumulator according to claim 1, wherein said body is arranged for being heated to said high temperature by using electric night energy.

6. An accumulator according to claim 1, wherein the accumulator body is composed of a ceramic material having approximately the following composition, measured by weight: 37% $Al_2O_3$, 5% $SiO_2$, 17% $FeO_3$, 1.7% $TiO_2$, 38% $CaO$, 0.5% $MgO$ and 0.8% alkaline agents.

7. An accumulator according to claim 1, wherein the accumulator is composed of a ceramic material, and said heating means comprises heating wires disposed in holes in the ceramic material and connected in series to an electric supply source.

* * * * *